United States Patent
Zhang et al.

(10) Patent No.: US 12,022,972 B2
(45) Date of Patent: Jul. 2, 2024

(54) TEMPERATURE MEASURING AND OVERFLOW PREVENTING PROBE FOR POT

(71) Applicant: Shenzhen Buydeem Technology Co., Shenzhen (CN)

(72) Inventors: George Mohan Zhang, Shenzhen (CN); Huajin Chen, Shenzhen (CN); Zhilin Peng, Shenzhen (CN); Zhen Fang, Shenzhen (CN); Zhen Sun, Shenzhen (CN)

(73) Assignee: SHENZHEN BUYDEEM TECHNOLOGY CO., Shenzhen (CN)

( * ) Notice: Subject to any disclaimer, the term of this patent is extended or adjusted under 35 U.S.C. 154(b) by 573 days.

(21) Appl. No.: 17/366,040

(22) Filed: Jul. 2, 2021

(65) Prior Publication Data
US 2022/0007874 A1    Jan. 13, 2022

(30) Foreign Application Priority Data

Jul. 10, 2020    (CN) .......................... 202010664999.5

(51) Int. Cl.
*A47J 27/62*      (2006.01)
*A47J 36/32*      (2006.01)

(52) U.S. Cl.
CPC ............. *A47J 27/62* (2013.01); *A47J 36/321* (2018.08); *A47J 2202/00* (2013.01)

(58) Field of Classification Search
CPC ....... A47J 27/62; A47J 36/321; A47J 2202/00
USPC .......................................................... 99/331
See application file for complete search history.

(56) References Cited

U.S. PATENT DOCUMENTS

| | | | | |
|---|---|---|---|---|
| 4,346,836 A * | 8/1982 | Nagel | ..................... | A47J 27/62 126/374.1 |
| 4,817,510 A * | 4/1989 | Kowalics | ................. | A47J 27/62 99/335 |
| 4,982,655 A * | 1/1991 | Wen-Der | ................. | A47J 31/56 99/344 |
| 5,814,721 A * | 9/1998 | Mills | .................. | G01N 33/2847 73/61.76 |
| 6,433,693 B1 * | 8/2002 | Mathews, Jr. | ......... | G01V 1/001 374/102 |
| 6,980,417 B2 * | 12/2005 | Chang | ................ | G01R 1/06788 361/659 |
| 10,278,410 B2 * | 5/2019 | Widitora | ................ | H05B 6/108 |
| 11,486,769 B2 * | 11/2022 | Cadima | .................. | G01K 1/024 |

(Continued)

*Primary Examiner* — Omar Flores Sanchez
(74) *Attorney, Agent, or Firm* — Ying-Ting Chen

(57) ABSTRACT

The present disclosure discloses a temperature measuring and overflow preventing probe for a pot to solve the technical problem to facilitate a user to use pots. The temperature measuring and overflow preventing probe for a pot of the present disclosure is provided with a head part and a probe needle connected below the head part. The probe needle is a vertically downward cylindrical structure; the lower part of the probe needle is a temperature detecting part, and the upper part is an overflow detecting part; a cylindrical connection part is connected between the temperature detecting part and the overflow detecting part; the connection part fixedly connects the temperature detecting part to the overflow detecting part to form a whole; the temperature detecting part and the overflow detecting part use conductive materials; and the connection part uses an insulation material.

10 Claims, 4 Drawing Sheets

(56) References Cited

U.S. PATENT DOCUMENTS

| 2016/0349743 | A1* | 12/2016 | Burkhardt | G05B 11/01 |
| 2017/0074522 | A1* | 3/2017 | Cheng | F24C 7/085 |
| 2017/0280510 | A1* | 9/2017 | Kim | A47J 36/321 |
| 2018/0242772 | A1* | 8/2018 | Jenkins | H04B 5/73 |

* cited by examiner

TEMPERATURE MEASURING AND OVERFLOW PREVENTING PROBE FOR POT

TECHNICAL FIELD

The present disclosure relates to a household appliance, in particular, a pot.

BACKGROUND

With the improvement of people's living standards, people have higher and higher requirements for the convenience of using household appliances, which is one of the reasons why smart household appliances are becoming more and more popular. At present, household soup pots, health pots, and electromagnetic heating pots have entered thousands of households. However, in the process of cooking food in various household pots, overflowing easily occurs in many pots because of unideal control over heating power or frothing during cooking of some food materials, which brings lots of troubles to a user to clean a cooking bench. In addition, the user needs to go to the cooking site to check the cooking of food. For example, the user cannot remotely check the temperature of cooked health soup. Many inconveniences are brought to consumers using this type of pot.

SUMMARY

The present disclosure is directed to provide a temperature measuring and overflow preventing probe for a pot to solve the technical problem to facilitate user's use of pots.

The present disclosure uses the following technical solution: a temperature measuring and overflow preventing probe for a pot, which is provided with a head part and a probe needle connected below the head part. The probe needle is a vertically downward cylindrical structure; the lower part of the probe needle is a temperature detecting part, and the upper part is an overflow detecting part; a cylindrical connection part is connected between the temperature detecting part and the overflow detecting part; the connection part fixedly connects the temperature detecting part to the overflow detecting part to form a whole; the temperature detecting part and the overflow detecting part use conductive materials; and the connection part uses an insulation material.

A first micro control unit (MCU) is arranged in the head part of the present disclosure, and the overflow detecting part is electrically connected with the first MCU.

The overflow detecting part of the present disclosure is connected to an overflow preventing output end through a rivet or a solder pad in a riveted or soldered manner, and the overflow preventing output end is electrically connected to the first MCU.

The first MCU of the present disclosure is connected with a temperature sensor, a first Bluetooth module and a rechargeable battery module.

The probe needle of the present disclosure is plugged into a through hole in a pot cover and extends into a pot body.

The pot body of the present disclosure is arranged on a base to form separable connection to the base; the base is provided with a charging socket; and the rechargeable battery module of the head part is electrically connected with the charging socket through a data wire.

A second MCU of the present disclosure is connected with a second Bluetooth module, a power control circuit and a power supply circuit, and the power control circuit is connected with a heat generating element.

The first Bluetooth module and the second Bluetooth module of the present disclosure are wirelessly connected to control a switch and power of the heat generating element.

The lower end of the probe needle of the present disclosure is closed, and the upper end is opened.

The upper end of the overflow detecting part of the present disclosure is fixedly connected with a shell of the head part.

Compared with the prior art, the present disclosure has the advantages that a pot or a health pot is provided with one wireless temperature detecting and overflow preventing probe, so that the temperature of food in the pot can be detected, whether soup in the pot is to overflow can be detected in time, and the heating power can be timely controlled. Meanwhile, the detected temperature of the food and the possibility of overflow can be output by means of WIFI or Bluetooth wireless transmission; and a data wire can also be used to directly connect a control base for temperature and overflow detection.

DETAILED DESCRIPTION

The present disclosure is further described in detail below in combination with the accompanying drawings and embodiments. A temperature measuring and overflow preventing probe of the present disclosure is a detecting device used for a small household pot, such as a soup pot, a health pot, and an electromagnetic heating pot.

Figure 1:
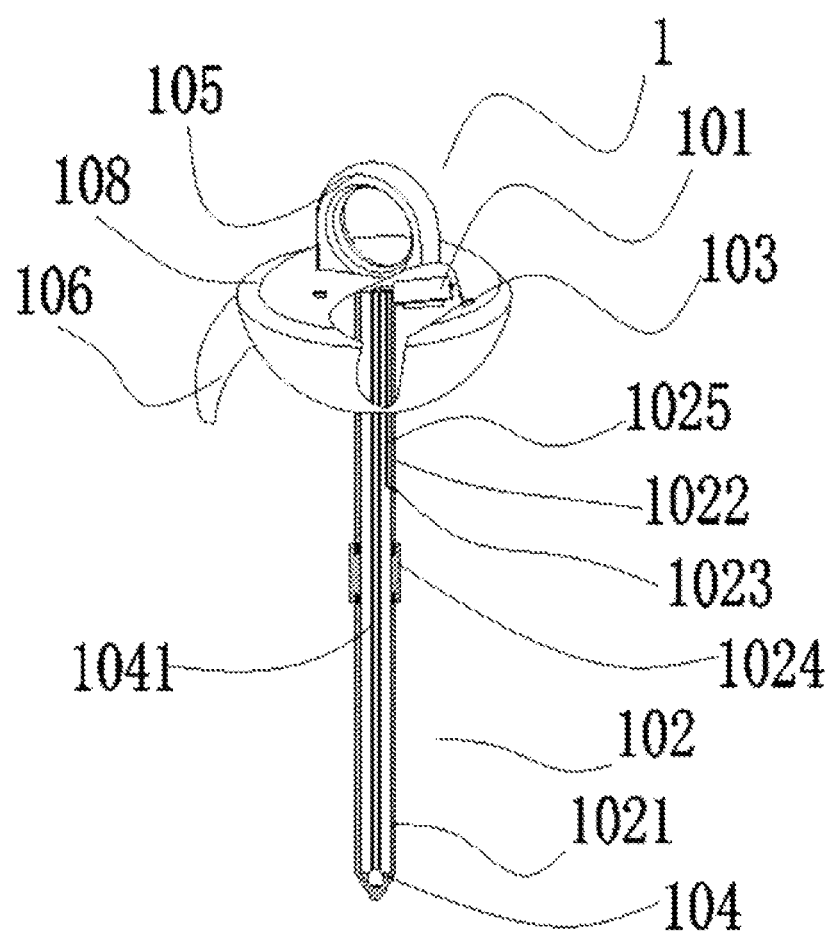
FIG. 1 is a schematic structural diagram of a temperature measuring and overflow preventing probe for a pot of the present disclosure.

As shown in FIG. 1, the detecting device is a probe 1. The probe 1 is provided with a head part 108 and a probe needle 102 connected below the head part 108.

The head part 108 is provided with a hemispheric shell with an upward opening; the shell is provided with a cover with a portable buckle 105; the exterior of the head part 108 is connected with a hook 106; and the shell of the head part 108 is also provided with a charging interface 103.

Figure 4:
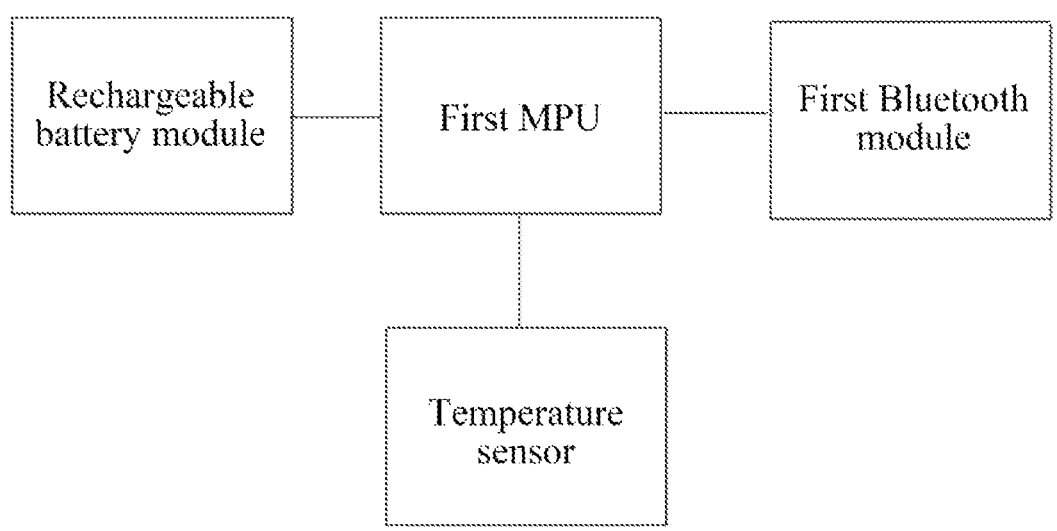
FIG. 4 is a circuit block diagram in a temperature measuring and overflow preventing probe for a pot of the present disclosure.

As shown in FIG. 4, a first micro control unit (MCU) is arranged in the hemispheric shell; the first MCU is connected with a temperature sensor 104, a first Bluetooth module 101, and a rechargeable battery module. The rechargeable battery module includes a battery and a charging circuit. The charging circuit is electrically connected to the charging interface 103. The battery and the charging circuit supply power to the first MCU and the first Bluetooth module 101.

The probe needle 102 is of a vertically downward cylindrical structure, the lower end of which is closed and the upper end of which is opened. The lower part of the probe needle 102 is a temperature detecting part 1021, and the upper part is an overflow detecting part 1022; a cylindrical connection part 1024 is connected between the temperature detecting part 1021 and the overflow detecting part 1022 in a sleeved manner; and the connection part 1024 fixedly connects the temperature detecting part 1021 to the overflow detecting part 1022 to form a whole. The upper end of the overflow detecting part 1022 is fixedly connected with the shell of the head part 108.

An output end 1041 of the temperature sensor 104 is electrically connected with the first MCU in the probe needle 102. A temperature sensing head of the temperature sensor 104 extends into the temperature detecting part 1021 and is in tight fit with the lower end part of the temperature detecting part 1021.

The temperature detecting part 1021 and the overflow detecting part 1022 of the probe needle 102 use a thermal and conductive material, such as copper or stainless steel, and the connection part 1024 uses an insulation material, such as plastic. The overflow detecting part 1022 is connected to an overflow preventing output end 1025 through a rivet or a solder pad 1023 in a riveted or soldered manner, and the overflow preventing output end 1025 is electrically connected to the first MCU.

During cooking of food in the pot, when water at the lower part of the pot is boiled, and water bubbles rise up and exceed the connection part 1024, the overflow detecting part 1022 and the temperature detecting part 1021 are connected to generate a varying signal of a resistance value that is transmitted to the first MCU via the overflow preventing output end 1025.

The probe needle 102 has an outer diameter of 3 to 15 mm, preferably 10 mm, and a length that is a distance of 3 to 50 mm between the end part of the temperature detecting part 1021 and the bottom surface of the pot body, preferably 20 mm. A distance from a joint of the temperature detecting part 1022 and the connection part 1024 to an upper opening of a pot body 3 is 15 to 40 mm, preferably 20 mm.

Figure 2:
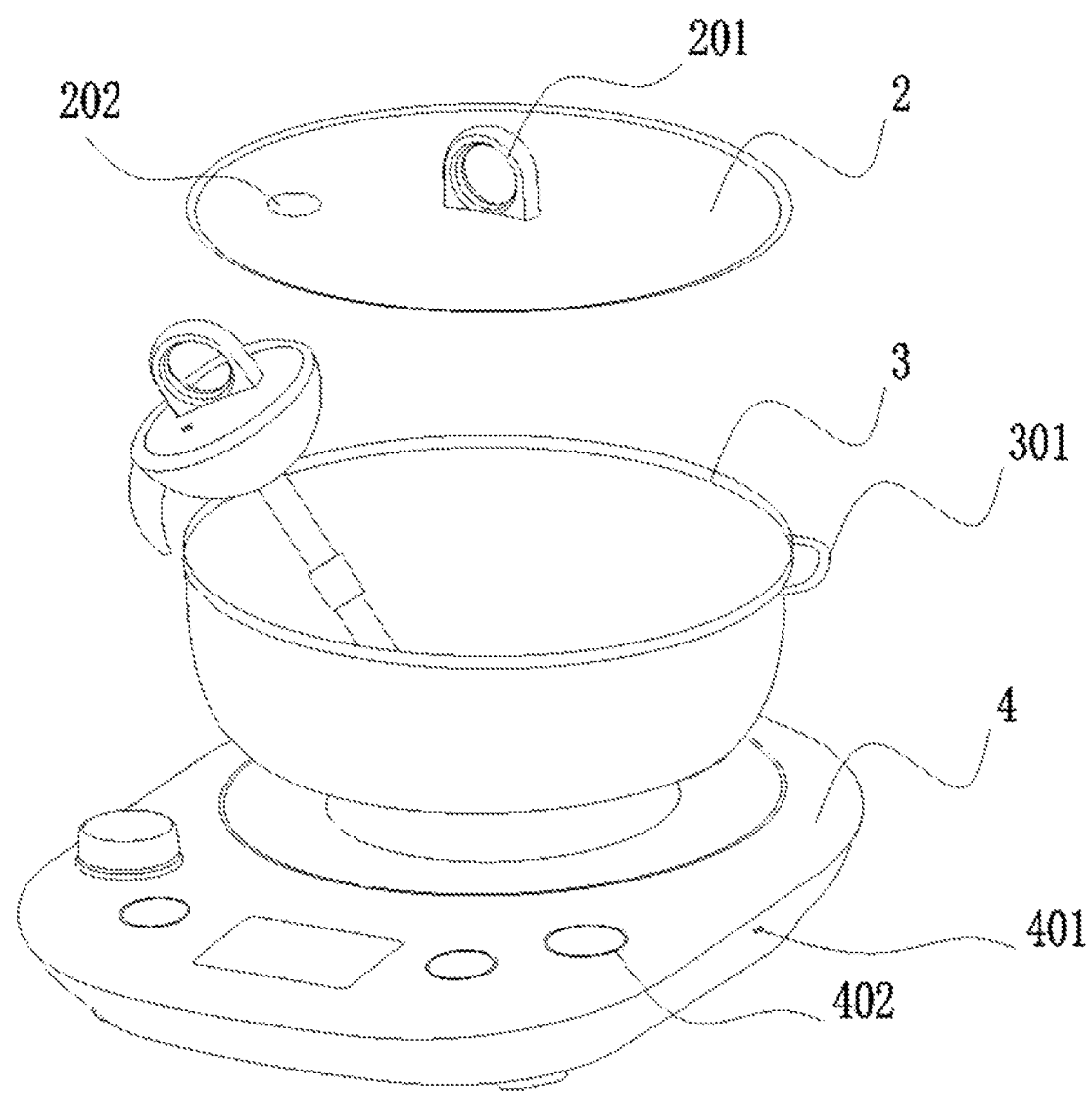
FIG. 2 is a schematic diagram illustrating that a temperature measuring and overflow preventing probe for a pot is placed in a pot of the present disclosure.
Figure 3:
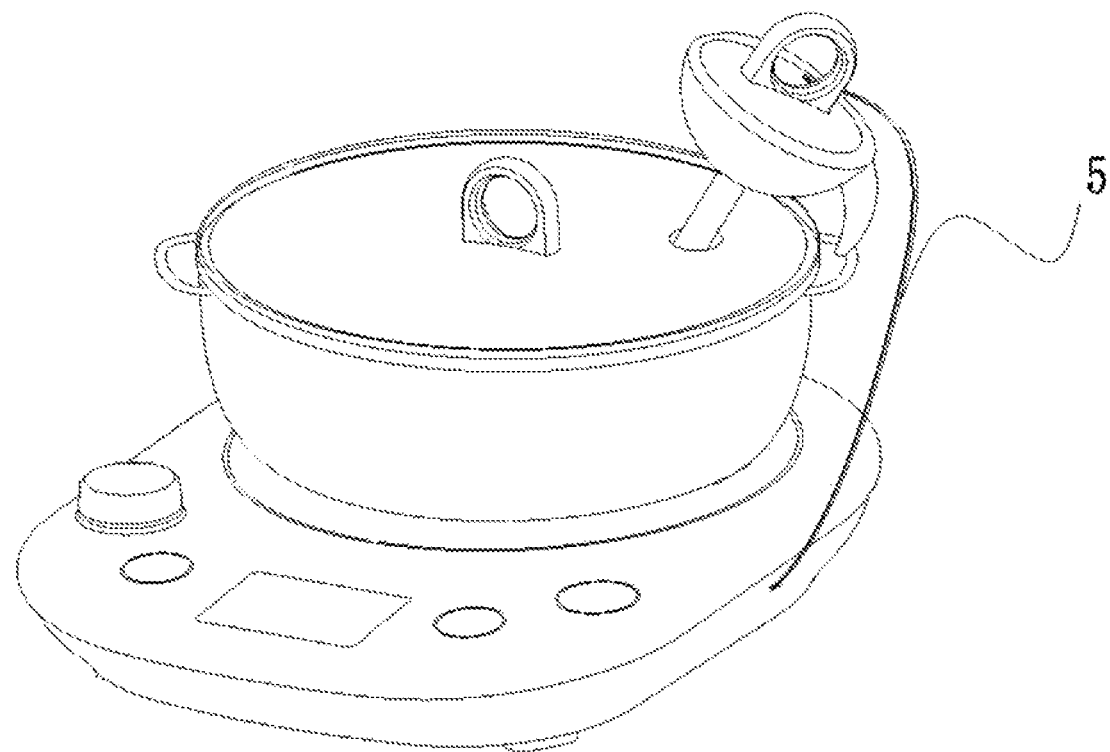
FIG. 3 is a schematic diagram illustrating that a temperature measuring and overflow preventing probe for a pot is connected with a data wire and plugged into a pot from a pot cover.

As shown in FIG. 2, the pot body 3 of the small household pot is placed on a base 4, and the pot body 3 and the base 4 form separable connection. The base 4 is provided with a charging socket 401. As shown in FIG. 3, the rechargeable battery module of the head part 108 of the probe 1 is electrically connected to the charging socket 401 through a data wire 5 to charge the rechargeable battery module of the head part 108.

A pot cover 2 covers the upper opening of the pot body 3. The middle of the pot cover 2 is connected with a handle 201. A through hole 202 is formed in the pot cover 2. The probe needle 102 of the probe 1 is plugged into the through hole 202 of the pot cover 2 and extends into the pot body 3.

Figure 5:
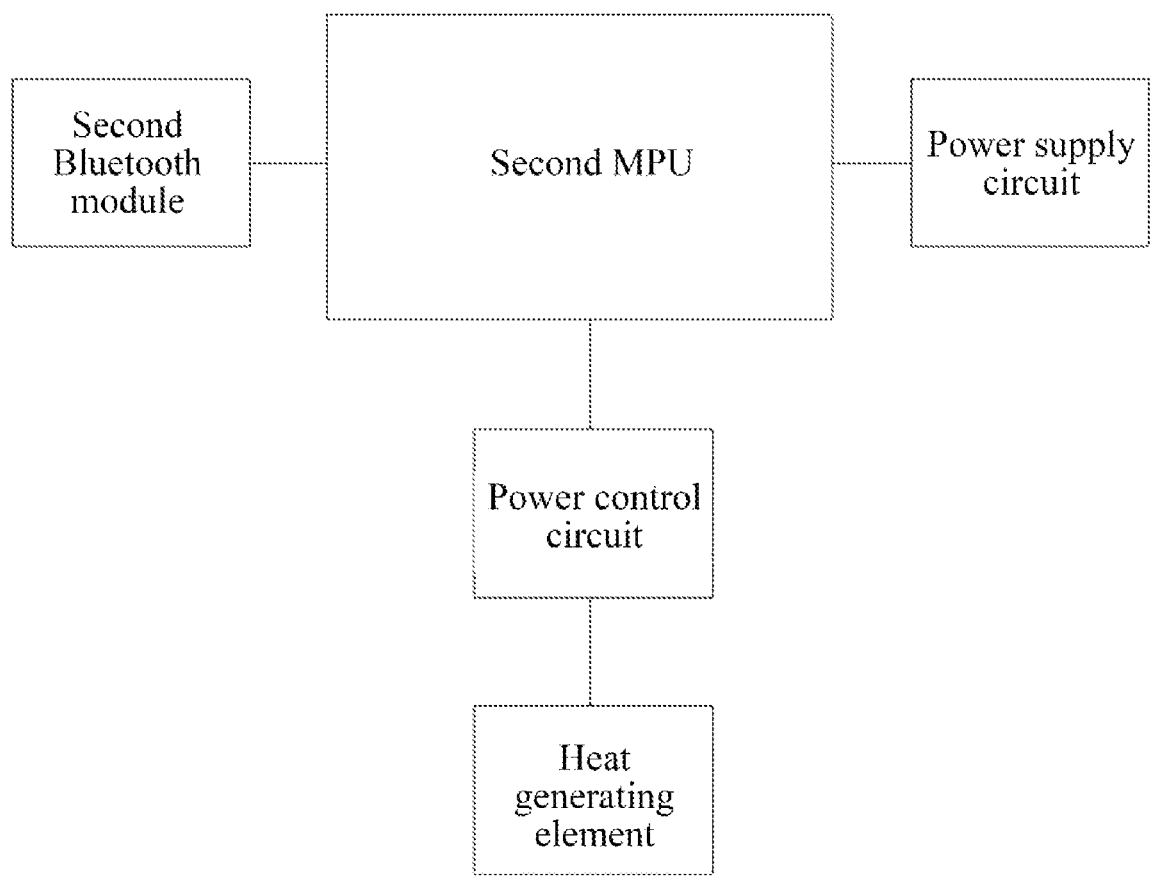
FIG. 5 is a schematic structural diagram of a circuit in a base of the present disclosure.

As shown in FIG. 5, a second MCU is arranged in the base 4, and is connected with a second Bluetooth module, a power control circuit and a power supply circuit, and the power control circuit is connected with a heat generating element. The first Bluetooth module 101 and the second Bluetooth module are wirelessly connected for signal transmission to control a switch and power of the heat generating element.

The probe 1 is connected to the charging socket 401 through the data wire 5 to realize charging.

A working process of the temperature measuring and overflow preventing probe for a pot of the present disclosure:

During use of the temperature measuring and overflow preventing probe for a pot of the present disclosure, firstly, food needing to be cooked is put into the pot body 3, and a proper amount of water is added; and then, the pot body 3 is placed on the base 4. At this time, the bottom of the pot body 3 is in tight fit with the heat generating element on the upper surface of the base 4, and the pot cover 2 covers the upper opening of the pot body 3.

The probe needle 102 of the probe 1 is aligned with and plugged into the through hole 202 of the pot cover 2, so that the probe needle 102 directly extends into the food or soup in the pot body 3; and the head part 108 of the probe 1 is locked on the pot cover 2 by the through hole 202 to enable the probe 1 to be stably fixed on the pot cover 2. At this time, the temperature detecting part 1021 in the probe 1 has been soaked into liquid of the soup, and the distance from the joint of the overflow detecting part 1022 in the probe 1 and the connection part 1024 to the upper opening of the pot is 15 to 40 mm.

Function setting is performed by selecting a button 402 on the base 4. When a "start" button is pressed, the pot starts to cook food or soup. The power control circuit on the base 4 starts to control the heat generating element to generate heat, and the bottom of the pot body 3 is heated by the heat generating element to heat the liquid in the pot body 3.

The first Bluetooth module 101 in the probe 1 starts to work and communicates with the second Bluetooth module in the base 4. After it is confirmed for the first time that the communication connection succeeds, when the probe 1 and the base 4 which are in communication connection are used, or when a mobile terminal in communication connection with the probe 1 is used (the mobile terminal may be a mobile phone or a flat computer, such as IPAD), signal transmission can be automatically realized.

The temperature sensor 104 in the probe 1 starts to sense a temperature change of the temperature detecting part 1021. The temperature detecting part 1021 changes as the temperature in the pot body 3 changes. The overflow detecting part 1022 starts to detect whether there is a water bubble rising up to the joint of the overflow detecting part and the connection part 1024. It is indicated that water is to overflow if a short circuit is formed between the overflow detecting part 1022 and the temperature detecting part 1021.

If the temperature sensor 104 senses a temperature change of the temperature detecting part 1021 and the overflow detecting part 1022 detects water bubbles and is connected to the temperature detecting part 1021, the generated varying signal of the resistance value is collected by the first MCU. After being processed according to the existing technology, the signal is transmitted to the second Bluetooth module in the base 4 through the first Bluetooth module 101, or is received by a third Bluetooth module connected with the mobile terminal. The third Bluetooth module connected with the mobile terminal performs processing in the second MCU in the base 4 of the mobile phone or the IPAD to control the power control circuit to control the heating element to generate or not generate heat. If the mobile terminal such as the mobile phone or the IPAD receives temperature change information sent from the first Bluetooth module 101 in the head part 108, the information can be instantly displayed on an APP of the mobile phone or the IPAD for a user to learn about a working state in the pot body 3.

The first Bluetooth module 101 in the head part 108 is powered by the rechargeable battery. When the rechargeable battery of the head part 108 has no power, the rechargeable battery can be charged by connecting the charging interface 103 arranged on the head part 108 to the charging socket 401 arranged on the base 4 by means of the charging wire 5.

The present disclosure can be used to detect the temperature in a pot body of a soup pot, a pot on an electromagnetic oven or other separable pots and prevent overflow, and is convenient and safe. The present disclosure uses the Bluetooth modules to perform signal transmission, and can also use WiFi signals for interconnection transmission.

Temperatures in electric appliances such as a pot and a health pot in the existing technology are detected by installing a temperature sensor on a heating element in a pot body, and overflow is also detected by disposing a special overflow preventing probe on or in the pot body, or disposing an overflow preventing probe at the upper part or mouth part of the pot body. The arrangement of these overflow preventing probes increases the difficulty of designing and machining structures of these pot bodies and pot covers and increases unnecessary cost. Meanwhile, the MCUs, Bluetooth, the temperature sensor, the rechargeable battery and the charging circuit are arranged in the probe of the present disclosure, and the temperature sensing part of the temperature sensor is in tight fit with the head of a temperature detecting rod, so that temperature data can be transmitted to the base and the mobile terminal through the Bluetooth to control heating of the pot or the health pot. The temperature of food in the pot or the health pot can be checked in time through the mobile terminal, which brings a great convenience to consumers' use.

In the temperature measuring and overflow preventing probe of the present disclosure, the MCUs, the Bluetooth and the charging module are integrated together are disposed at the head part of the probe. Two sections of probe needles are used, i.e., one section for temperature measuring and one section for overflow preventing. Wireless control or wired control can be used, so that the product cost is effectively reduced, and the user experience is also enhanced.

The invention claimed is:

1. A temperature measuring and overflow preventing probe for a pot, wherein the temperature measuring and overflow preventing probe for a pot is provided with a head part (108) and a probe needle (102) connected below the head part (108); the probe needle (102) is a vertically downward cylindrical structure; the lower part of the probe needle (102) is a temperature detecting part (1021), and the upper part is an overflow detecting part (1022); a cylindrical connection part (1024) is connected between the temperature detecting part (1021) and the overflow detecting part (1022); the connection part (1024) fixedly connects the temperature detecting part (1021) to the overflow detecting part (1022) to form a whole; the temperature detecting part (1021) and the overflow detecting part (1022) use conductive materials; and the connection part (1024) uses an insulation material.

2. The temperature measuring and overflow preventing probe for the pot according to claim 1, wherein a first micro control unit (MCU) is arranged in the head part (108), and the overflow detecting part (1022) is electrically connected with the first MCU.

3. The temperature measuring and overflow preventing probe for the pot according to claim 2, wherein the overflow detecting part (1022) is connected to an overflow preventing output end (1025) through a rivet or a solder pad (1023) in a riveted or soldered manner, and the overflow preventing output end (1025) is electrically connected to the first MCU.

4. The temperature measuring and overflow preventing probe for the pot according to claim 3, wherein the first MCU is connected with a temperature sensor (104), a first Bluetooth module (101) and a rechargeable battery module.

5. The temperature measuring and overflow preventing probe for the pot according to claim 4, wherein the probe needle (102) is plugged into a through hole (202) in a pot cover (2) and extends into a pot body (3).

6. The temperature measuring and overflow preventing probe for the pot according to claim 5, wherein the pot body (3) is arranged on a base (4) to form separable connection to the base (4); the base (4) is provided with a charging socket (401); and the rechargeable battery module of the head part (108) is electrically connected with the charging socket (401) through a data wire (5).

7. The temperature measuring and overflow preventing probe for the pot according to claim 6, wherein a second MCU is connected with a second Bluetooth module, a power control circuit and a power supply circuit, and the power control circuit is connected with a heat generating element.

8. The temperature measuring and overflow preventing probe for the pot according to claim 7, wherein the first Bluetooth module (101) and the second Bluetooth module are wirelessly connected to control a switch and power of the heat generating element.

9. The temperature measuring and overflow preventing probe for the pot according to claim 1, wherein the lower end of the probe needle (102) is closed, and the upper end is opened.

10. The temperature measuring and overflow preventing probe for the pot according to claim 1, wherein the upper end of the overflow detecting part (1022) is fixedly connected with a shell of the head part (108).

\* \* \* \* \*